(12) United States Patent
Anderson et al.

(10) Patent No.: US 12,238,014 B2
(45) Date of Patent: **\*Feb. 25, 2025**

(54) IDENTIFYING UNMANAGED CLOUD RESOURCES WITH ENDPOINT AND NETWORK LOGS

(71) Applicant: Cisco Technology, Inc., San Jose, CA (US)

(72) Inventors: Blake Harrell Anderson, Chapel Hill, NC (US); Andrew Chi, Chapel Hill, NC (US); David Arthur McGrew, Poolesville, MD (US); Saran Singh Ahluwalia, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,403

(22) Filed: Jan. 4, 2024

(65) Prior Publication Data
US 2024/0297852 A1   Sep. 5, 2024

Related U.S. Application Data

(63) Continuation of application No. 17/390,319, filed on Jul. 30, 2021, now Pat. No. 11,888,760.

(51) Int. Cl.
*H04L 47/70* (2022.01)
*G06N 20/00* (2019.01)
(Continued)

(52) U.S. Cl.
CPC ............ *H04L 47/82* (2013.01); *G06N 20/00* (2019.01); *H04L 43/08* (2013.01); *H04L 67/10* (2013.01)

(58) Field of Classification Search
CPC ......... H04L 47/82; H04L 43/08; H04L 67/10; G06N 20/00; G06N 3/042; G06N 5/022
See application file for complete search history.

(56) References Cited

U.S. PATENT DOCUMENTS 8,289,968 B1   10/2012   Zhuang
9,049,117 B1    6/2015   Nucci
(Continued)

OTHER PUBLICATIONS

McAfee, "What is a CASB," downloaded Feb. 3, 2021, from https://www.mcafee.com/enterprise/en-in/security-awareness/cloud/what-is-a-casb.html, 12 pages.
(Continued)

*Primary Examiner* — El Hadji M Sall
(74) *Attorney, Agent, or Firm* — Lee & Hayes, P.C.

(57) ABSTRACT

Techniques and mechanisms for identifying unmanaged cloud resources with endpoint and network logs and attributing the identified cloud resources to an entity of an enterprise that owns the cloud resources. The process collects data from sources, e.g., endpoint and network logs, with respect to traffic in a computer network and based at least in part on the data, extracts relationships related to the traffic. The process applies rules to the relationships to extract destinations in the computer network that provide cloud resources in a cloud environment, wherein the cloud resources are owned by an enterprise. One or more users or business entities of the enterprise are identified as accessing the cloud resources.

20 Claims, 6 Drawing Sheets

(51) Int. Cl.
*H04L 43/08* (2022.01)
*H04L 67/10* (2022.01)

(56) References Cited

U.S. PATENT DOCUMENTS

| | | |
|---|---|---|
| 10,848,382 B1 | 11/2020 | Allshouse et al. |
| 2014/0123269 A1 | 5/2014 | Drihem et al. |
| 2016/0294614 A1* | 10/2016 | Searle ................. H04L 67/34 |
| 2017/0063909 A1 | 3/2017 | Muddu et al. |
| 2018/0026984 A1* | 1/2018 | Maker ................. H04L 63/102 |
| | | 726/4 |
| 2019/0155961 A1 | 5/2019 | Alonso |
| 2020/0137097 A1 | 4/2020 | Zimmermann et al. |
| 2021/0020036 A1* | 1/2021 | Adetiloye ............ G08G 1/0133 |
| 2023/0029656 A1 | 2/2023 | Anderson |

OTHER PUBLICATIONS

Office Action for U.S. Appl. No. 17/390,319, mailed on May 9, 2023, Anderson, "Identifying Unmanaged Cloud Resources With Endpoint and Network Logs", 8 pages.

Office Action for U.S. Appl. No. 17/390,319, mailed on Dec. 19, 2022, Blake Harrell Anderson, "Identifying Unmanaged Cloud Resources With Endpoint and Network Logs", 7 pages.

\* cited by examiner

IDENTIFYING UNMANAGED CLOUD RESOURCES WITH ENDPOINT AND NETWORK LOGS

CROSS-REFERENCE TO RELATED APPLICATION

This patent application is a continuation of and claims priority to U.S. patent application Ser. No. 17/390,319, filed Jul. 30, 2021, which is fully incorporated herein by reference.

TECHNICAL FIELD

The present disclosure relates generally to computer networks, and, more particularly, to identifying unmanaged cloud resources with endpoint and network logs and attributing the identified cloud resources to an entity.

BACKGROUND

Monitoring cloud resources provided by cloud computing service providers such as computing instances and/or storage buckets for vulnerabilities and misconfigurations is critical to ensure a proper security posture. Large enterprises often manage this problem through a provisioning system that ensures that the enterprise has the proper authorization to identify assets and review policy files and logs. For example, some entities use an application(s) or platform to provision cloud accounts, which may integrate an additional monitoring application(s) or framework to ensure cloud configurations and instances can be audited. Unfortunately, any enterprise of sufficient complexity needs to address cases where the cloud tenants either avoid the enterprise's official provisioning system or remove the enterprise's programmatic access to resources for cost or efficiency reasons. For example, in scenarios the monitoring application(s) or framework may be unaware of at least 800 storage buckets that are used for an enterprise's work.

The identification of these cloud resources may be complicated by the fact that an enterprise's employees may take advantage of cloud-hosted resources from many enterprise's sources on any given day. Differentiating the enterprise-owned assets from generic assets is a key problem. Once the enterprise-owned resources are identified, attributing those resources to employees or business units is necessary to facilitate remediation.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
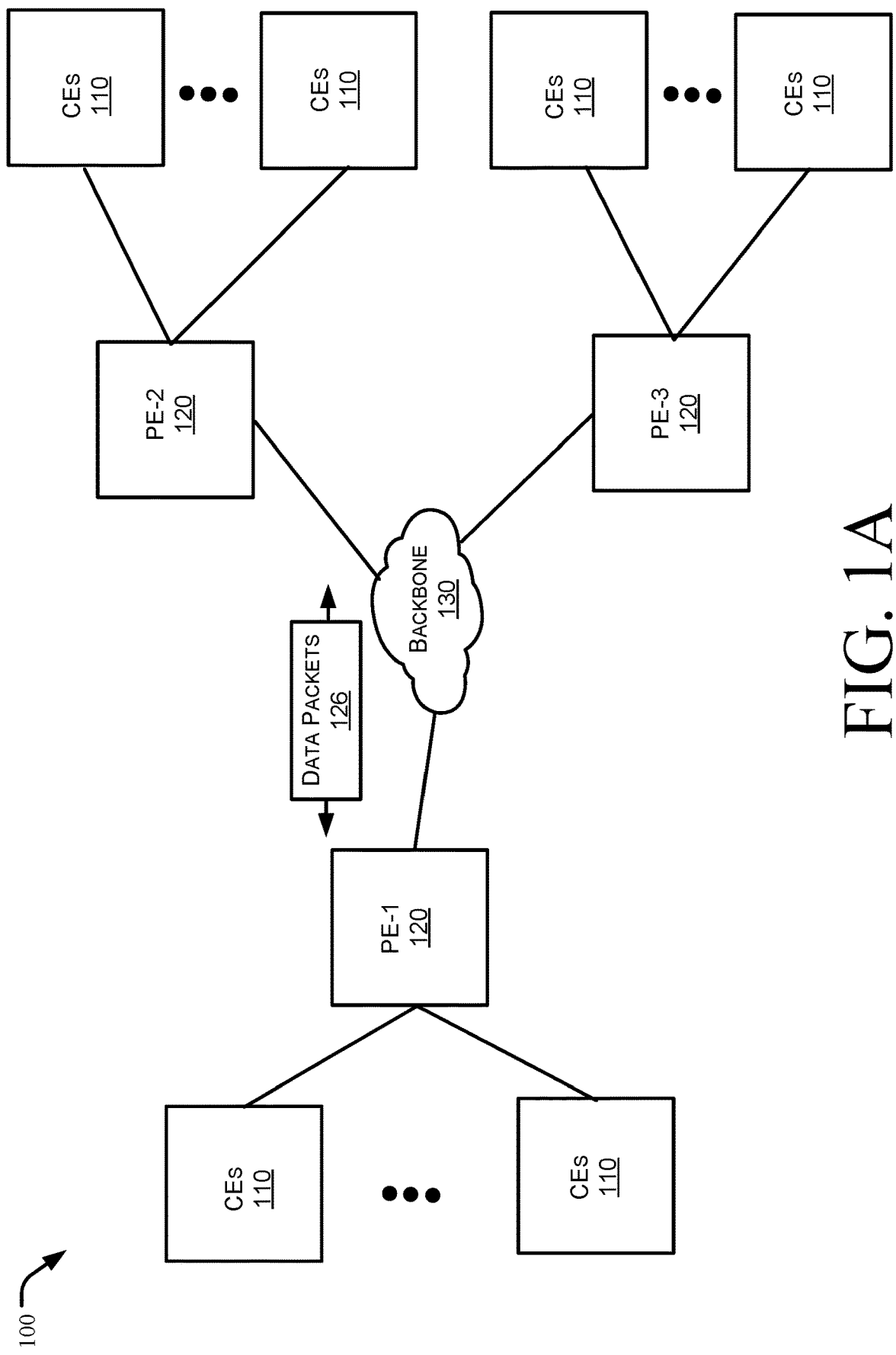
FIGS. 1A-1C illustrate an example communication network that carries encrypted traffic.

This disclosure describes techniques for using data sources for analysis with respect to a network, including, for example, a network visibility module (NVM), monitoring application(s), which may include an endpoint monitoring application, e.g., Continuous Security Buddy, or framework(s) to monitor cloud configurations and instances so that the cloud configurations and instances can be monitored, and a network monitoring program or application, e.g., mercury. At a high-level, the purposes of the datasets from these data sources include, for example, (i) the NVM maps ground truth usernames and process information to cloud connections, (ii) the monitoring application provides a list of enterprise-owned cloud assets (e.g., Amazon Web Service (AWS) assets, Google Cloud Storage (GCP) assets, and Microsoft Azure assets), along with the responsible business entities of the enterprise, and (iii) the network monitoring application providing greater network coverage relative to the NVM, specifically data center/cloud connectivity. In configurations, process/user information may be inferred based on data in part derived from the NVM. The NVM generally provides detailed endpoint data, e.g., data related to source endpoints and destination endpoints, collected on the source endpoint itself. The monitoring application may be used because endpoint data is not always obtained for all endpoints. In configurations, an endpoint monitoring application may provide data with respect to traffic in the network. The network monitoring application provides some ground truth as to provisioning and endpoints.

The process may begin by extracting relationships from the NVM logs and/or network monitoring program logs. The records may be filtered first so that the destination Internet Protocol (IP) addresses are in some set of interesting subnets, which in an example are subnets belonging to a first cloud asset(s) owned by an enterprise. The post-filtered records may then be processed to extract relationships in order to build a bipartite knowledge graph representing interactions between enterprise employees and cloud resources provided by the first cloud asset(s). For example, if an endpoint is accessed at a cloud services provider that provides enterprise-owned cloud resources by a user using an enterprise-owned computing device, it may be likely that the user is accessing enterprise-owned cloud resources. Likewise, if a developer is accessing an endpoint at a cloud services provider that provides enterprise-owned cloud resources via an email account, it may be unlikely that the developer is accessing enterprise-owned cloud resources since developers generally do not access enterprise-owned cloud resources via an email account. Bipartite graphs may be characterized in several different ways. For example, a graph is bipartite if and only if it does not contain an odd cycle. A graph is bipartite if and only if it is 2-colorable, (i.e. its chromatic number is less than or equal to 2). The spectrum of a graph is symmetric if and only if it is a bipartite graph.

In particular, in the mathematical field of graph theory, a bipartite graph (or bigraph) is a graph whose vertices can be divided into two disjoint and independent sets U and V such that every edge connects a vertex in U to one in V. Vertex sets U and V are usually called the parts of the graph. Equivalently, a bipartite graph is a graph that does not contain any odd-length cycles. The two sets U and V may be thought of as a coloring of the graph with two colors: if one colors all nodes in U blue, and all nodes in V green, each edge has endpoints of differing colors, as is required in the graph coloring problem. In contrast, such a coloring is impossible in the case of a non-bipartite graph, such as a triangle: after one node is colored blue and another green, the third vertex of the triangle is connected to vertices of both colors, preventing it from being assigned either color. One often writes G=(U, V, E) to denote a bipartite graph whose partition has the parts U and V, with E denoting the edges of the graph. If a bipartite graph is not connected, it may have more than one bipartition. In this case, the (U, V, E) notation is helpful in specifying one particular bipartition that may be of importance in an application. If |U|=|V|, that is, if the two subsets have equal cardinality, then G is called a balanced bipartite graph. If all vertices on the same side of the bipartition have the same degree, then G is called biregular.

In configurations, the nodes of the graph may represent the users and the fully qualified domain names (FQDNs)/Internet Protocol (IP) addresses of the cloud resources. An edge exists between a user node and destination node if that user communicated with the destination. Edges may be annotated with additional information to add context to the connections, including the process that initiated the connection, an identification of the destination port, an identification of the source device or port, and a timestamp.

With the graph built, rules may then be applied to extract destinations that are likely owned by the enterprise. The query language can include simple rules that only consider a single connection, e.g., all destinations that a user connects to over a particular IP port, e.g., IP port 22. More advanced rules may also be defined that take the interaction of multiple connections into account, e.g., all destinations that a user connects to using a non-browser process after connecting to a cloud service management principal (console, signin, container registry, etc.). In addition, the set of users connecting to a given cloud resource may be used to infer the most likely business entity of the enterprise responsible for that cloud resource. For example, if an endpoint is accessed at a cloud services provider that provides enterprise-owned cloud resources by a user using an enterprise-owned computing device, it may be likely that the user is accessing enterprise-owned cloud resources. Likewise, if a developer is accessing an endpoint at a cloud services provider that provides enterprise-owned cloud resources via an email account, it may be unlikely that the developer is accessing enterprise-owned cloud resources since developers generally do not access enterprise-owned cloud resources via an email account.

In configurations, one or more machine learning algorithms may be used. In configurations, graph neural networks and/or data mining methods may be used.

In configurations, the output of this process may be summarized in a compact computer-readable format, e.g., compact comma separated files (CSV) format, containing all the enterprise-owned cloud assets and indicating users and/or business units of an enterprise with respect to use of the enterprise-owned cloud resources. The output may be further filtered by removing assets that are already known to the monitoring application(s), e.g., to show what the monitoring applications are missing.

Additionally, the techniques described herein may be performed by a system and/or apparatus having non-transitory computer-readable media storing computer-executable instructions that, when executed by one or more processors, performs the method described above.

Example Embodiments

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising devices/nodes, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 126 (e.g., traffic/messages) may be exchanged among the devices/nodes of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using a CE router with two MPLS VPN links (e.g., from different service providers), with potentially a backup link (e.g., a 3G/4G/5G/LTE connection). A site of type B may itself be of different types:

2a.) Site Type B1: a site connected to the network using two MPLS VPN links (e.g., from different service providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
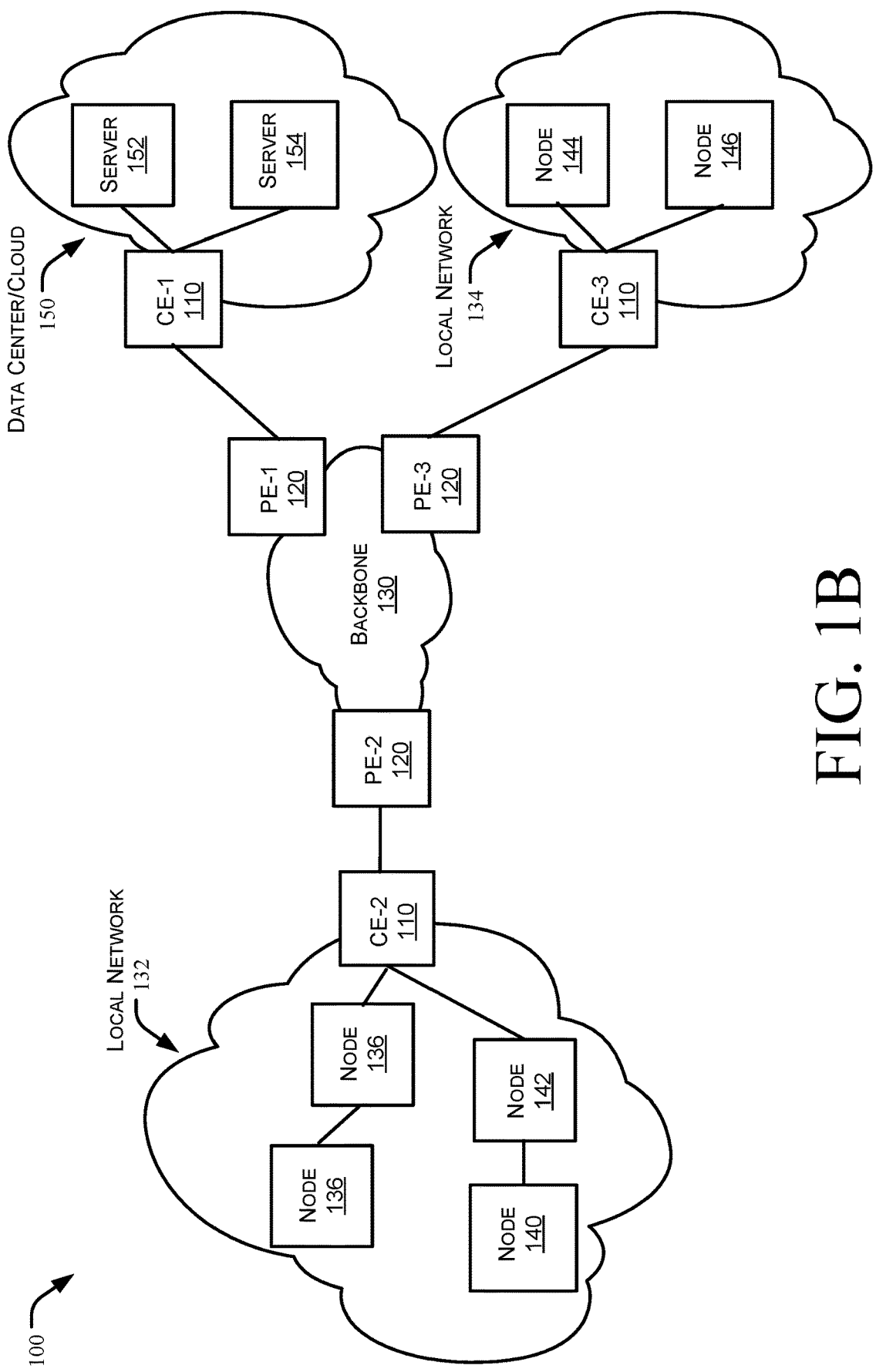

FIG. 1B illustrates an example of network 100 in greater detail, according to various embodiments. As shown, network backbone 130 may provide connectivity between devices located in different geographical areas and/or different types of local networks. For example, network 100 may comprise local networks 132, 134 that include devices/nodes 136, 138, 140, and 142, and devices/nodes 144 and 146, respectively, as well as a data center/cloud environment 150 that includes servers 152 and 154. Notably, local networks 132 and 134 and data center/cloud environment 150 may be located in different geographic locations. Network 100 may include more local networks in various configurations. Additionally, each local network may include more or fewer devices/nodes in various configurations.

Servers 152 and 154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

Figure 1C:
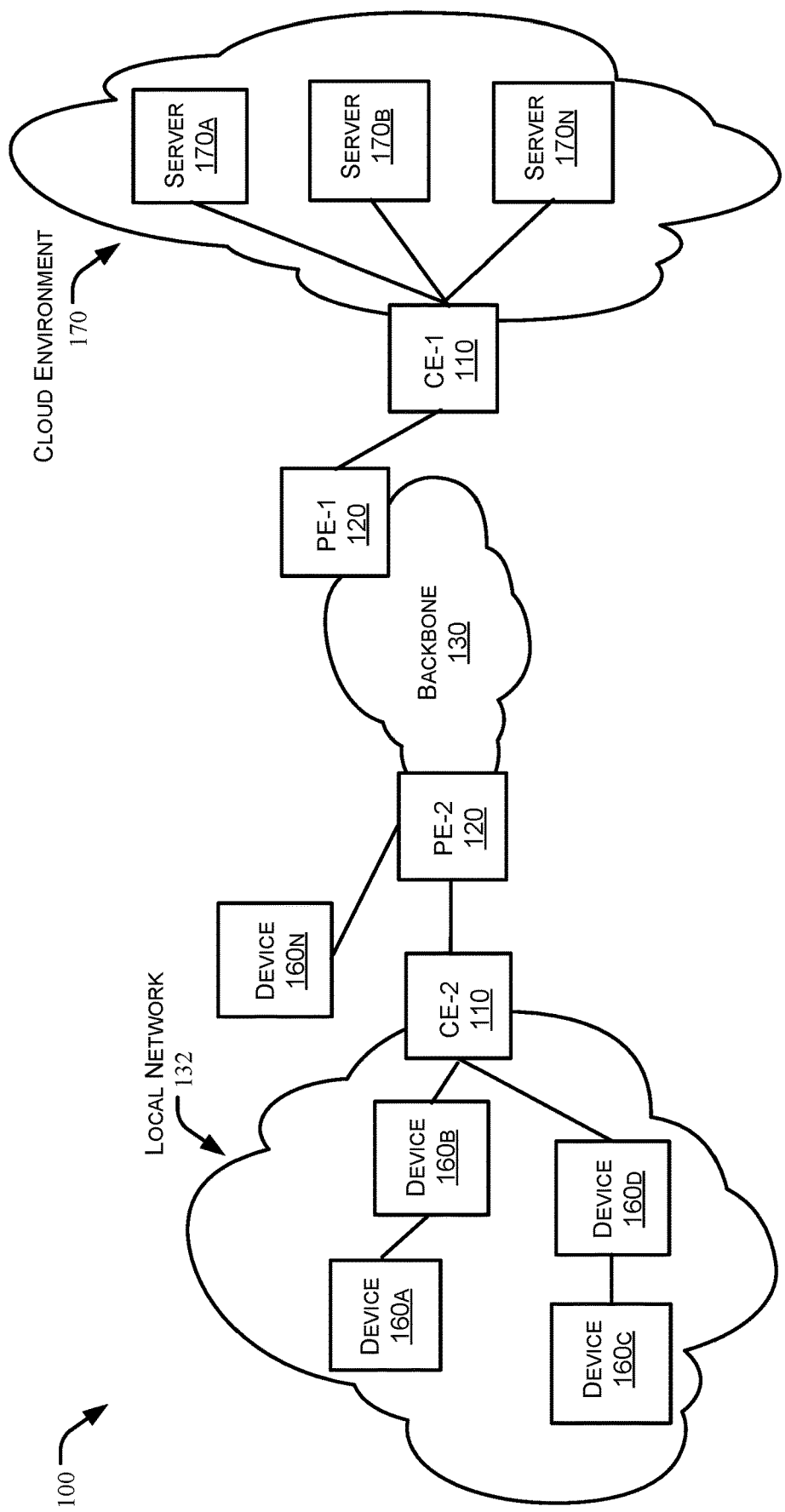

FIG. 1C illustrates another example of network 100, according to various embodiments. As shown, network backbone 130 may provide connectivity between devices and cloud environments. For example, network 100 may comprise multiple devices/nodes 160a, . . . , 160n, as well as a cloud environment 170 that includes multiple servers 172a, . . . , 172n. In configurations, one or more of the devices/nodes 160 may be part of a local network 132 or may be external to the local network 132. Notably, the devices 160 and the cloud environment 170 may be located in the same or different geographic locations. Network 100 may include more or fewer devices/nodes 160 and/or more cloud environments 170 in various configurations. Also, each cloud environment 170 may include more or fewer servers 172 in various configurations.

As is known, the cloud environment(s) 170 (also referred to herein as cloud computing service providers) provides cloud resources to users of the devices/nodes 160 via the servers 172. Enterprises need to monitor cloud resources provided by the cloud environment(s) 170 such as computing instances and/or storage buckets for vulnerabilities and misconfigurations to ensure a proper security posture. Large enterprises often manage this problem through a provisioning system that ensures that the enterprise has the proper authorization to identify assets and review policy files and logs. For example, some enterprises use an application(s) or platform to provision cloud accounts for authorized users, which may integrate an additional monitoring application(s) or framework to ensure cloud configurations and instances can be audited. Unfortunately, any enterprise of sufficient complexity needs to address cases where authorized users of an enterprise either avoid the enterprise's official provisioning system or remove the enterprise's programmatic access to cloud resources for cost or efficiency reasons.

The identification of these cloud resources may be complicated by the fact that an enterprise's employees may take advantage of cloud-hosted resources from many enterprise's sources on any given day. Differentiating the enterprise-owned assets from generic assets is a key problem for enterprises. Once the cloud resources are identified, attributing those resources to employees and/or business units is necessary to facilitate remediation.

Accordingly, in configurations, primary data sources may be used by an enterprise for analysis of cloud resources used in the network 100 by authorized users of the enterprise. In configurations, three primary data sources may include, for example, (i) a network visibility module (NVM), (ii) monitoring application(s) or framework(s), which may include an endpoint monitoring application, to monitor cloud configurations and instances so that the cloud configurations and instances can be monitored, and (iii) a network monitoring program or application. At a high-level, the purpose of the datasets from the data sources includes, for example, (i) the NVM to map ground truth usernames and process information to cloud connections, (ii) the monitoring application to provide a list of enterprise-owned cloud assets (e.g., Amazon Web Service (AWS) assets, Google Cloud Storage (GCP) assets, and Microsoft Azure assets), along with the responsible business entities of the enterprise, and (iii) the network monitoring application to provide greater network coverage relative to the NVM, specifically data center/cloud connectivity. In configurations, process/user information may be inferred based on data in part derived from the NVM. The NVM generally provides detailed endpoint data, e.g., data related to source endpoints and destination endpoints, collected on the source endpoint itself. The monitoring application may be used because endpoint data is not always obtained for all endpoints. In configurations, an endpoint monitoring application may provide data with respect to traffic in the network 100. The network monitoring application provides some ground truth as to provisioning and endpoints.

In configurations, the process may begin by extracting relationships from the NVM logs and/or network monitoring program logs. The logs may be filtered first so that the destination Internet Protocol (IP) addresses are in a set of interesting subnets, which in an example are subnets belonging to a first cloud asset(s), e.g., a first enterprise-owned cloud asset. The post-filtered logs may then be processed to extract relationships in order to build a bipartite knowledge graph representing interactions between enterprise employees and cloud resources provided by the first cloud asset(s). For example, if an endpoint is accessed at a cloud services provider that provides enterprise-owned cloud resources by a user using an enterprise-owned computing device, it may be likely that the user is accessing enterprise-owned cloud resources. Likewise, if a developer is accessing an endpoint at a cloud services provider that provides enterprise-owned cloud resources via an email account, it may be unlikely that the developer is accessing enterprise-owned cloud resources since developers generally do not access enterprise-owned cloud resources via an email account. Bipartite graphs may be characterized in several different ways. For example, a graph is bipartite if and only if it does not contain an odd cycle. A graph is bipartite if and only if it is 2-colorable, (i.e. its chromatic number is less than or equal to 2). The spectrum of a graph is symmetric if and only if it is a bipartite graph.

In particular, in the mathematical field of graph theory, a bipartite graph (or bigraph) is a graph whose vertices can be divided into two disjoint and independent sets U and V such that every edge connects a vertex in U to one in V. Vertex sets U and V are usually called the parts of the graph. Equivalently, a bipartite graph is a graph that does not contain any odd-length cycles. The two sets U and V may be thought of as a coloring of the graph with two colors: if one colors all nodes in U blue, and all nodes in V green, each edge has endpoints of differing colors, as is required in the graph coloring problem. In contrast, such a coloring is impossible in the case of a non-bipartite graph, such as a triangle: after one node is colored blue and another green, the third vertex of the triangle is connected to vertices of both colors, preventing it from being assigned either color. One often writes G=(U, V, E) to denote a bipartite graph whose partition has the parts U and V, with E denoting the edges of the graph. If a bipartite graph is not connected, it may have more than one bipartition. In this case, the (U, V, E) notation is helpful in specifying one particular bipartition that may be of importance in an application. If |U|=|V|, that is, if the two subsets have equal cardinality, then G is called a balanced bipartite graph. If all vertices on the same side of the bipartition have the same degree, then G is called biregular.

In particular, when modeling relations between two different classes of objects, bipartite graphs very often arise naturally. For instance, a graph of football players and clubs, with an edge between a player and a club if the player has played for that club, is a natural example of an affiliation network, a type of bipartite graph used in social network analysis. Another example where bipartite graphs appear naturally is in the (NP-complete) railway optimization problem, in which the input is a schedule of trains and their stops, and the goal is to find a set of train stations as small as possible such that every train visits at least one of the chosen stations. This problem can be modeled as a dominating set problem in a bipartite graph that has a vertex for each train and each station and an edge for each pair of a station and a train that stops at that station. A third example is in the academic field of numismatics. Ancient coins are made using two positive impressions of the design (the obverse and reverse). The charts numismatists produce to represent the production of coins are bipartite graphs.

In configurations, the nodes of the graph may represent the users and the fully qualified domain names (FQDNs)/IP addresses of the cloud resources. An edge exists between a user node, e.g., device 160 and destination node, e.g., cloud environment 170 and/or server 172, if the user at the user node communicated with the destination node. Edges may be annotated with additional information to add context to the connections, including the process that initiated the connection, an identification of the destination port, an identification of the source device or port, and a timestamp.

With the graph built, rules may then be applied to extract destinations that are likely owned by the enterprise. The query language can include simple rules that only consider a single connection, e.g., all destinations that a user connects to over a particular IP port, e.g., IP port 22. More advanced rules may also be defined that take the interaction of multiple connections into account, e.g., all destinations that a user connects to using a non-browser process after connecting to a cloud service management principal (console, signin, container registry, etc.). In addition, the set of users connecting to a given cloud resource may be used to infer the most likely business entity of the enterprise responsible for that cloud resource. For example, if an endpoint is accessed at a cloud services provider that provides enterprise-owned cloud resources by a user using an enterprise-owned computing device, it may be likely that the user is accessing enterprise-owned cloud resources. Likewise, if a developer is accessing an endpoint at a cloud services provider that provides enterprise-owned cloud resources via an email account, it may be unlikely that the developer is accessing enterprise-owned cloud resources since developers generally do not access enterprise-owned cloud resources via an email account.

In configurations, one or more machine learning algorithms may be used. In configurations, graph neural networks and/or data mining methods may be used.

In configurations, the output of this process may be summarized in a compact computer-readable format, e.g., compact comma separated files (CSV) format containing all the enterprise-owned cloud assets and indicating users and/or business units of an enterprise with respect to use of the enterprise-owned cloud resources. The output may be further filtered by removing assets that are already known to the monitoring application(s), e.g., to show what the monitoring applications are missing.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 132 may be an LLN in which CE-2 operates as a root node for devices/nodes 136, 138, 140, and 142 in the local mesh, in some embodiments.

Figure 2:
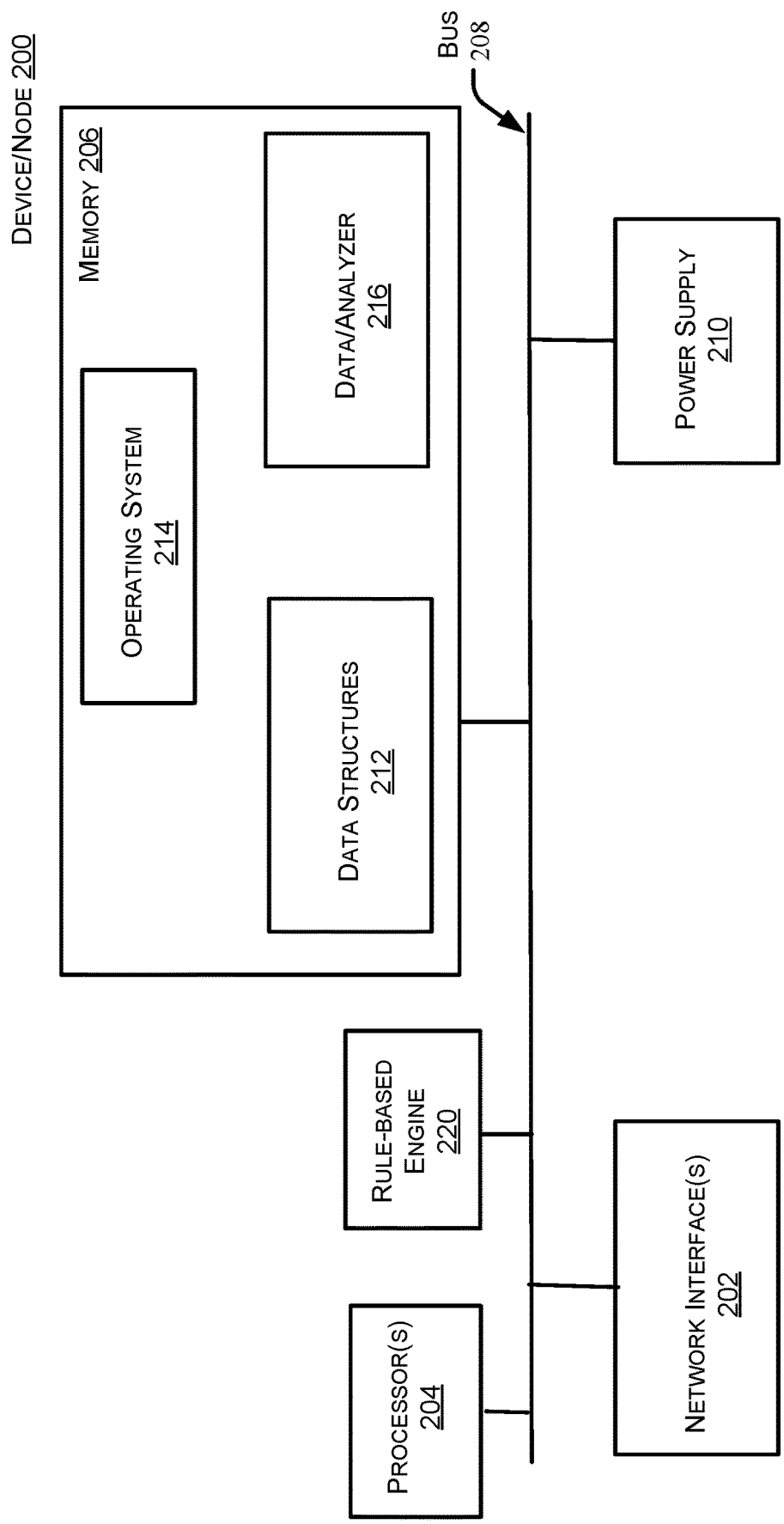
FIG. 2 illustrates an example network device/node of the example communication network of FIGS. 1A-1C.

FIG. 2 is a schematic block diagram of an example device/node 200 that may be used with one or more embodiments described herein, e.g., as any of the computing devices shown in FIGS. 1A-1C, particularly the PE routers 120, CE routers 110, devices/nodes 136-146 and 160, servers 152, 154, and 172 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 202, one or more processors 204, and a memory 206 interconnected by a system bus 208 and is powered by a power supply 210.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 202 may also be used to implement one or more virtual network interfaces, such as for virtual private network (VPN) access, known to those skilled in the art.

The memory 206 comprises a plurality of storage locations that are addressable by the processor(s) 204 and the network interfaces 202 for storing software programs and data structures associated with the embodiments described herein. The processor(s) 204 may comprise necessary elements or logic adapted to execute the software programs and manipulate the data structures 212. An operating system 214, portions of which are typically resident in memory 206 and executed by the processor(s), functionally organizes the node by, inter alia, invoking network operations in support of software processors and/or services executing on the device. These software processors and/or services may comprise a data analyzer to analyze data from primary data sources that may be used by an enterprise for analysis of cloud resources used in the network 100 by authorized users of the enterprise, as previously described. For example, the data analyzer 216 may extract relationships from the NVM logs and/or network monitoring program logs. The logs may be filtered first so that the destination Internet Protocol (IP) addresses are in a set of interesting subnets, which in an example are subnets belonging to a first cloud asset(s), e.g., a first enterprise-owned cloud asset. The post-filtered logs may then be processed by the data analyzer 216 to extract relationships in order to build a bipartite knowledge graph representing interactions between enterprise employees and cloud resources provided by the first cloud asset(s). For example, if an endpoint is accessed at a cloud services provider that provides enterprise-owned cloud resources by a user using an enterprise-owned computing device, it may be likely that the user is accessing enterprise-owned cloud resources. Likewise, if a developer is accessing an endpoint at a cloud services provider that provides enterprise-owned cloud resources via an email account, it may be unlikely that the developer is accessing enterprise-owned cloud resources since developers generally do not access enterprise-owned cloud resources via an email account.

With the graph built, the device 200 a rule-based engine 220 may then apply rules to extract destinations that are likely owned by the enterprise. The query language can include simple rules that only consider a single connection, e.g., all destinations that a user connects to over a particular IP port, e.g., IP port 22. More advanced rules may also be defined that take the interaction of multiple connections into account, e.g., all destinations that a user connects to using a non-browser process after connecting to cloud service management principal (console, signin, container registry, etc.). In addition, the set of users connecting to a given cloud resource may be used to infer the most likely business entity of the enterprise responsible for that cloud resource. For example, if an endpoint is accessed at a cloud services provider that provides enterprise-owned cloud resources by a user using an enterprise-owned computing device, it may be likely that the user is accessing enterprise-owned cloud resources. Likewise, if a developer is accessing an endpoint at a cloud services provider that provides enterprise-owned cloud resources via an email account, it may be unlikely that the developer is accessing enterprise-owned cloud resources since developers generally do not access enterprise-owned cloud resources via an email account.

The rule-based engine 220 may be part of the device 200 or may be part of a different device in the network 100. The rule-based engine 220 may encode known behaviors (e.g., browsers have more diversity in their destinations while cloud orchestration software predominately talks to subnets located in cloud-based networks) and/or dominate domain names or certificates often indicate the client process (e.g., a website for malware protection is by far the most popular destination for Advanced Malware Protection (AMP) for endpoints). The rule-based engine 220 may use rules generated from ground-truth databases and experts.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
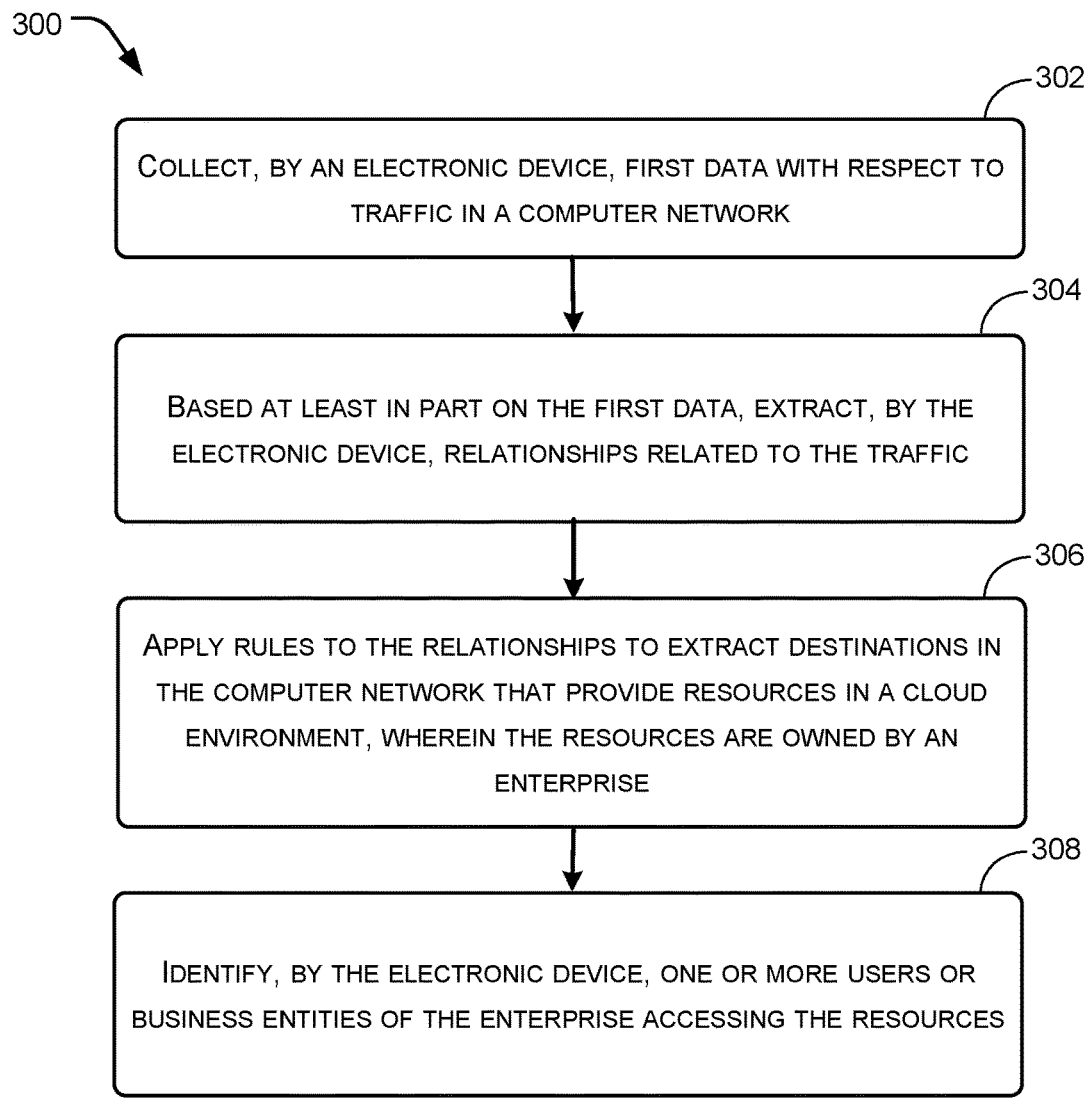
FIG. 3 illustrates a flow diagram of an example method for identifying unmanaged cloud resources with endpoint and network logs and attributing the identified cloud resources to an entity.

FIG. 3 illustrates a flow diagram of an example method 300 that illustrates aspects of the functions described herein. The logical operations described herein with respect to FIG. 3 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, Application-Specific Integrated Circuit (ASIC), and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for identifying unmanaged cloud resources with endpoint and network logs and attributing the identified cloud resources to an entity of an enterprise that owns the cloud resources. At 302, an electronic device, e.g., device/node 200, collects first data with respect to traffic in a computer network, e.g., network 100. In configurations, the first data may be related to one or more of second data from logs of network visibility module or (ii) third data from logs of a network monitoring application. At 304, the electronic device, based at least in part on the first data, may extract relationships related to the traffic. In configurations, extracting the relationships may comprise constructing a bipartite knowledge graph. At 306, rules may be applied to the relationships to extract destinations in the computer network that provide resources in a cloud environment, wherein the resources are owned by an enterprise. In configurations, the rules may be applied using a machine learning algorithm. At 308, the electronic device may identify one or more users or business entities of the enterprise accessing the resources. In configurations, identifying one or more users or business entities of the enterprise accessing the resources comprises may comprise summarizing the resources and indicating users and/or business units of the enterprise in a compact computer-readable format, e.g., compact comma separated files (CSV) format.

While the techniques and configurations described herein have been described with emphasis on the transport layer security (TLS) protocol, the techniques and configurations described herein may also be applicable to other protocols such as, for example, QUIC, secure shell (SSH), hypertext transfer protocol (http), etc.

Figure 4:
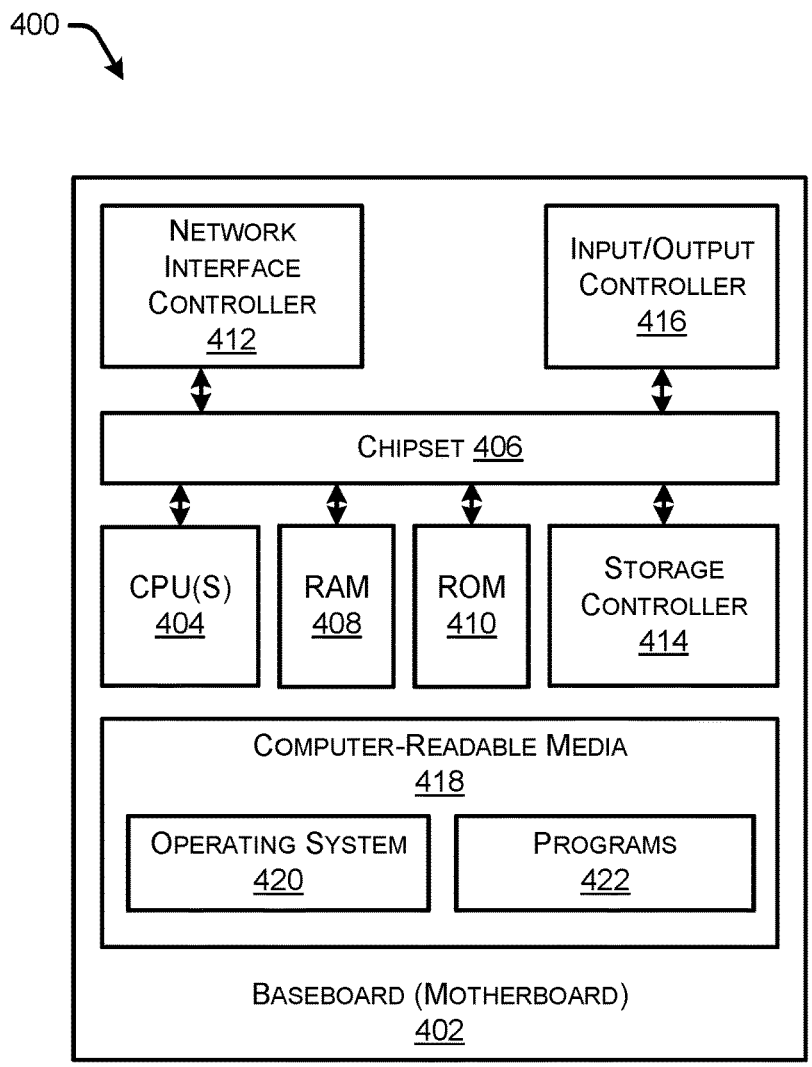
FIG. 4 is a computer architecture diagram showing an illustrative computer hardware architecture for implementing one or more elements of the communication network that can be utilized to implement aspects of the various technologies presented herein.

FIG. 4 shows a further example computer architecture for a computer 400, e.g., device/node 200, capable of executing program components for implementing the functionality described above. One or more computers 400 shown in FIG. 4 may be used to implement one or more elements of the example network 100 described herein, e.g., the PE routers 120, CE routers 110, devices/nodes 136-146 and 160, servers 152, 154, and 172, and may comprise a conventional server computer, workstation, desktop computer, laptop, tablet, network appliance, e-reader, smartphone, or other computing device, and can be utilized to execute any of the software components presented herein. In some examples, however, the computer 400 may correspond to networked devices such as servers, switches, routers, hubs, bridges, gateways, modems, repeaters, access points, etc., and can be utilized to execute any of the software components presented herein.

The computer 400 includes a baseboard 402, or "motherboard," which is a printed circuit board to which a multitude of components or devices can be connected by way of a system bus or other electrical communication paths. In one illustrative configuration, one or more central processing units ("CPUs") 404 operate in conjunction with a chipset 406. The CPUs 404 can be standard programmable processors that perform arithmetic and logical operations necessary for the operation of the computer 400.

The CPUs 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 406 provides an interface between the CPUs 404 and the remainder of the components and devices on the baseboard 402. The chipset 406 can provide an interface to a RAM 408, used as the main memory in the computer 400. The chipset 406 can further provide an interface to a computer-readable storage medium such as a read-only memory ("ROM") 410 or non-volatile RAM ("NVRAM") for storing basic routines that help to startup the computer 400 and to transfer information between the various components and devices. The ROM 410 or NVRAM can also store other software components necessary for the operation of the computer 400 in accordance with the configurations described herein.

The computer 400 can operate in a networked environment using logical connections to remote computing devices and computer systems through a network. The chipset 406 can include functionality for providing network connectivity through a NIC 412, such as a gigabit Ethernet adapter. The NIC 412 is capable of connecting the computer 400 to other computing devices over the network. It should be appreciated that multiple NICs 412 can be present in the computer 400, connecting the computer to other types of networks and remote computer systems.

The computer 400 can be connected to a storage device 418 that provides non-volatile storage for the computer. The storage device 418 can store an operating system 420, programs 422, and data, which have been described in greater detail herein. The storage device 418 can be connected to the computer 400 through a storage controller 414 connected to the chipset 406. The storage device 418 can consist of one or more physical storage units. The storage controller 414 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 400 can store data on the storage device 418 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 418 is characterized as primary or secondary storage, and the like.

For example, the computer 400 can store information to the storage device 418 by issuing instructions through the storage controller 414 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 400 can further read information from the storage device 418 by detecting the physical states or characteristics of one or more particular locations within the physical storage units.

In addition to the mass storage device 418 described above, the computer 400 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 400.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 418 can store an operating system 420 utilized to control the operation of the computer 400. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 418 can store other system or application programs and data utilized by the computer 400.

In one embodiment, the storage device 418 or other computer-readable storage media is encoded with computer-executable instructions which, when loaded into the computer 400, transform the computer from a general-purpose computing system into a special-purpose computer capable of implementing the embodiments described herein. These computer-executable instructions transform the computer 400 by specifying how the CPUs 404 transition between states, as described above. According to one embodiment, the computer 400 has access to computer-readable storage media storing computer-executable instructions which, when executed by the computer 400, perform the various processes described above with regard to FIGS. 1-3. The computer 400 can also include computer-readable storage media having instructions stored thereupon for performing any of the other computer-implemented operations described herein.

The computer 400 can also include one or more input/output controllers 416 for receiving and processing input from a number of input devices, such as a keyboard, a mouse, a touchpad, a touch screen, an electronic stylus, or other type of input device. Similarly, an input/output controller 416 can provide output to a display, such as a computer monitor, a flat-panel display, a digital projector, a printer, or other type of output device. It will be appreciated that the computer 400 might not include all of the components shown in FIG. 4, can include other components that are not explicitly shown in FIG. 4, or might utilize an architecture completely different than that shown in FIG. 4.

The programs 422 may comprise any type of programs or processes to perform the techniques described in this disclosure for managing workloads in compute clusters comprising compute nodes by managing the workloads at the resource level of the compute clusters. Generally, the programs 422 may comprise one or more modules or components to perform any of the operations described herein by any of the different types of devices/nodes described herein. In some instances, the programs may run inside of virtual machines, containers, and/or other virtual resources types.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
 collecting, by an electronic device, first data with respect to traffic in a computer network;
 based at least in part on the first data, extracting, by the electronic device, relationships related to the traffic;
 applying rules to the relationships to extract destinations in the computer network that provide enterprise-owned resources in a cloud environment, wherein the enterprise-owned resources are cloud resources comprising at least one of computing instances or storage buckets located within the cloud environment and are owned by an enterprise; and identifying, by the electronic device, (i) one or more users that are accessing the enterprise-owned resources or (ii) one or more business entities accessing the enterprise-owned resources.

2. The method of claim 1, wherein collecting the first data comprises collecting one or more of (i) second data from logs of an endpoint monitoring application or (ii) third data from logs of a network monitoring application.

3. The method of claim 1, wherein a monitoring application provides a list of enterprise-owned cloud resources.

4. The method of claim 1, wherein extracting relationships comprises constructing a bipartite knowledge graph.

5. The method of claim 4, further comprising annotating edges of the bipartite knowledge graph with information.

6. The method of claim 5, wherein the information comprises one or more of (i) a process that initiated the traffic, (ii) an identification of a destination port, (iii) an identification of a source device, or (iv) a timestamp.

7. The method of claim 1, wherein identifying, by the electronic device, (i) one or more users that are associated with the enterprise and accessing the enterprise-owned resources or (ii) one or more business entities that are associated with the enterprise and accessing the enterprise-owned resources comprises summarizing the enterprise-owned resources and indicating users and/or business units of the enterprise in a compact computer-readable format.

8. The method of claim 1, wherein applying rules to the relationships comprises applying the rules using a machine learning algorithm.

9. An apparatus comprising:
one or more processors; and
one or more non-transitory computer-readable media storing computer-executable instructions that, when executed by the one or more processors, cause the one or more processors to perform actions comprising:
collecting, by an electronic device, first data with respect to traffic in a computer network;
based at least in part on the first data, extracting, by the electronic device, relationships related to the traffic;
applying rules to the relationships to extract destinations in the computer network that provide enterprise-owned resources in a cloud environment, wherein the enterprise-owned resources are cloud resources comprising at least one of computing instances or storage buckets located within the cloud environment and are owned by an enterprise; and
identifying, by the electronic device, (i) one or more users that are accessing the enterprise-owned resources or (ii) one or more business entities accessing the enterprise-owned resources.

10. The apparatus of claim 9, wherein collecting the first data comprises collecting one or more of (i) second data from logs of an endpoint monitoring application or (ii) third data from logs of a network monitoring application.

11. The apparatus of claim 9, wherein a monitoring application provides a list of enterprise-owned cloud resources.

12. The apparatus of claim 9, wherein extracting relationships comprises constructing a bipartite knowledge graph.

13. The apparatus of claim 12, further comprising annotating edges of the bipartite knowledge graph with information.

14. The apparatus of claim 13, wherein the information comprises one or more of (i) a process that initiated the traffic, (ii) an identification of a destination port, (iii) an identification of a source device, or (iv) a timestamp.

15. The apparatus of claim 9, wherein identifying, by the electronic device, (i) one or more users that are associated with the enterprise and accessing the enterprise-owned resources or (ii) one or more business entities that are associated with the enterprise and accessing the enterprise-owned resources comprises summarizing the enterprise-owned resources and indicating users and/or business units of the enterprise in a compact computer-readable format.

16. The apparatus of claim 9, wherein applying rules to the relationships comprises applying the rules using a machine learning algorithm.

17. One or more non-transitory computer-readable media storing computer-executable instructions that, when executed by one or more processors, cause the one or more processors to perform actions comprising:
collecting, by an electronic device, first data with respect to traffic in a computer network;
based at least in part on the first data, extracting, by the electronic device, relationships related to the traffic;
applying rules to the relationships to extract destinations in the computer network that provide enterprise-owned resources in a cloud environment, wherein the enterprise-owned resources are cloud resources comprising at least one of computing instances or storage buckets located within the cloud environment and are owned by an enterprise; and
identifying, by the electronic device, (i) one or more users that are accessing the enterprise-owned resources or (ii) one or more business entities accessing the enterprise-owned resources.

18. The one or more non-transitory computer-readable media of claim 17, wherein collecting the first data comprises collecting one or more of (i) second data from logs of an endpoint monitoring application or (ii) third data from logs of a network monitoring application.

19. The one or more non-transitory computer-readable media of claim 17, wherein a monitoring application provides a list of enterprise-owned cloud resources.

20. The one or more non-transitory computer-readable media of claim 17, wherein extracting relationships comprises constructing a bipartite knowledge graph and the actions further comprise:
annotating edges of the bipartite knowledge graph with information,
wherein the information comprises one or more of (i) a process that initiated the traffic, (ii) an identification of a destination port, (iii) an identification of a source device, or (iv) a timestamp.

* * * * *